UNITED STATES PATENT OFFICE.

HERMAN A. BRASSERT, OF BRADDOCK, PENNSYLVANIA.

METHOD OF MANUFACTURING STEEL.

1,032,653.     Specification of Letters Patent.     Patented July 16, 1912.

No Drawing.     Application filed November 11, 1904. Serial No. 232,377.

*To all whom it may concern:*

Be it known that I, HERMAN A. BRASSERT, a subject of the King of Great Britain and Ireland, residing at Braddock, in the county of Allegheny and State of Pennsylvania, have invented a new and useful Improvement in Methods of Manufacturing Steel, of which the following is a specification.

This invention relates to steel manufacture and, as an object, has the provision of a method whereby steel may be produced more rapidly and at less cost than by any of the methods now known to me.

A further object of this invention has been to provide a method whereby any kind of pig iron may be utilized whether high or low in phosphorus.

A further object has been to provide a method whereby the yield is far greater than that of the Bessemer process and whereby the cost of installation is reduced to a minimum, and the operating cost to an extremely low point.

A still further object of this invention has been to provide a method of steel manufacture whereby steel of any desired analysis may be produced from molten iron derived from any source without the addition of external heat except that carried by the blast hereinafter referred to.

A further object has been to provide a method the principle of which is applicable to and can be utilized with processes now known whereby the carrying out of the process to which it is applied is greatly facilitated, the time required shortened, the reaction placed under absolute control, and the steel produced improved.

These and other objects I attain by means of the method hereinafter described.

In carrying out this invention I preferably employ a circular receptacle of suitable dimensions, lined with acid or basic fire brick and covered with a brick lined roof. A suitable number of twyers ranged around the receptacle above the metal line are positioned so as to direct the air issuing from them downwardly onto the surface of the metal in the bath whereby a whirling or rotary motion will be given to the metal. A cast of iron derived from any source is tapped or run into the receptacle, either before or after a suitable quantity of oxidizing agents, such as oxides and lime or other fluxes have been charged thereinto.

If cold pig iron, instead of molten iron, derived from a source external to the hearth or receptacle, together with ore, steel scrap or other oxidizing and purifying agents are charged into the hearth or receptacle, such heat, derived from sources and applied in a manner now well known, will be utilized as will render the iron of the proper fluidity.

When the fluid iron in the receptacle or hearth and the oxidizing agents come into contact the reaction sets in and most of the silicon, manganese and phosphorus are removed. As soon as the reaction between the molten iron and the oxidizing agents sets in, compressed air is admitted to the twyers, and an extremely rapid surface oxidation is obtained, which is controllable at all times by varying the amount or pressure of the air admitted, and from the fact that the air blasts are directed onto the surface of the metal instead of into or through the same, a steel very much freer from occluded gas is obtained, and, in fact, a steel superior to the product of any known process with which large quantities can be worked. The air for the blast, if desired, may be derived from the hot blast stoves of the furnace, and whether hot or cold air is used no other external heat than that of the air is necessary, unless cold instead of molten pig iron is charged.

The action of the oxids on the silicon, manganese and phosphorus generates sufficient heat to keep the bath liquid, and by directing the air blast onto the metal of the bath in the manner described the heat may be increased to any desired degree and there maintained throughout the desired period whereby the reaction is accelerated.

The directing of the compressed air downwardly onto the metal of the bath insures that the zone of greatest heat is maintained in close proximity to the metal, whereby the heat derived from the combustion, accelerated by the oxygen of the blast, is utilized in the most efficient manner. By regulating the pressure and amount of the compressed air or blast, the speed of the reaction and the degree of the heat is controllable and regulable at all times.

When working high phosphorus iron, it is found advantageous to keep the heat of the bath as low as possible during the early stage of the process as will insure fluidity of basic slag, as in this way the phosphorus is most readily removed.

By having the temperature of the bath under control by the regulable blast, and by drawing off the phosphorous slag continuously, it is possible to almost entirely remove the phosphorus from the bath before the carbon combustion begins.

The carbon combustion can be started at any desired time simply by increasing the air blast, thereby immediately raising the temperature of the bath. It will be seen that the carbon can either be completely removed and the charge recarbonized by methods now well known, or else the carbon by means of the regulable blast can be brought down to any desired point corresponding to the percentage required in the finished steel.

In utilizing this method with fluid iron derived from a source external to the receptacle or hearth, it has been found desirable to work about 200 tons of metal in the receptacle at a time, and it is best worked at a speed which allows from 50 to 100 tons of steel to be drawn off at the time another cast of pig iron is in condition to be admitted to the receptacle. By thus working, a continuous process is obtained and a layer of fluid metal at all times protects the bottom of the receptacle from the destructive influences of the slag. The highly oxidizing slag formed on the surface, combined with the air of the blast and the circulation currents set up thereby, rapidly oxidize the impurities present.

It will be found that this process is equally applicable to the use of iron of varied composition, and that the yield is far greater than the yield from the Bessemer process, as the reduction of part of the oxids will more than make up for any loss due to oxidation of the pig iron charge.

Under certain conditions a tilting furnace is found advantageous as it facilitates the removal of the steel and slag.

Owing to the large charge which can be worked, the operating cost per ton of steel produced is naturally very low compared to the cost per ton of steel produced by any of the open hearth processes heretofore employed. The cost of repairs is practically nothing as the apparatus necessary is extremely simple.

The heat generated by the air blast impinging on the surface of the large metal bath, and the heat generated by the great rapidity of conversion of such a great mass of metal is so intense, that more oxids can be worked by this method than by any other methods known to me, and also more cold pig iron and steel scrap can be worked up in the receptacle containing the bath than by other methods. The air blast at all times during the process maintains an abundance of oxygen at the point of contact between the molten metal and the slag, whereby the reaction between the metal and the slag is greatly intensified.

The heat due to oxidation is conserved, and the zone of greatest heat is maintained in close proximity to the bath, and does not escape therefrom as it does in a Bessemer converter, or the hearth or receptacle of the open hearth processes as now practised.

It will be understood that "dry air" produced by any desired method, such as by refrigeration or suitable electrical discharges; oxygen, or air enriched with oxygen may constitute the blast, and this invention is not limited to the use of a blast of any particular kind of fluid, but, having thus described my invention,

What I claim as new and useful and desire to secure by Letters Patent is:—

1. The process of making liquid steel which consists in collecting and retaining within a receptacle a bath of molten iron in quantity sufficient to keep the bath liquid throughout the entire process without the aid of external heat by conserving and utilizing the initial heat of the molten iron, then in subjecting the molten iron to the action of suitable metallic oxids, then facilitating the reaction between the molten metal and the slag formed by directing downwardly onto the surface of the bath a suitable blast of tair then in adding to the bath such substance or substances as will convert the molten iron into steel of the desired analysis and finally withdrawing liquid steel from said receptacle.

2. The process of making liquid steel which consists in collecting and retaining within a receptacle a bath of molten iron in quantity sufficient to keep the bath liquid throughout the entire process without the aid of external heat by conserving and utilizing the initial heat of the molten iron, then in subjecting the molten iron to the action of suitable metallic oxids and fluxes and one or more air blasts directed downwardly onto its surface then in adding to the bath such substance or substances as will convert the molten iron into steel of the desired analysis and finally in running off finished steel in a liquid state.

3. The process of making liquid steel low in phosphorus from iron high in phosphorus which consists in collecting and retaining within a receptacle a bath of molten iron in quantity sufficient to keep the bath liquid throughout the entire process without the aid of external heat by conserving and utilizing the initial heat of the molten iron, then subjecting the molten iron to the action of metallic oxids and suitable fluxes, then bringing sufficient air into the receptacle on top of the bath in the form of one or more blasts to facilitate the reaction between the slag formed and the molten metal then in adding to the bath suitable substances for converting the molten iron into steel and finally running off finished steel in a liquid state.

4. The process of making liquid steel low in phosphorus from high phosphorous ores which consists in collecting and retaining within a receptacle a bath of molten iron high in phosphorus and in quantity sufficient to keep the bath liquid throughout the entire process without the aid of external heat by conserving and utilizing the initial heat of the molten iron, then subjecting the molten iron to the action of metallic oxids and suitable fluxes, then facilitating the reaction between the molten metal and the slag formed by means of one or more air blasts directed downwardly upon the surface of the bath at such an angle as to set up circulation currents then in adding to the bath such substance or substances as will convert the molten iron into steel of the desired analysis and finally withdrawing liquid steel in a finished state.

5. The process of making steel, which consists in providing a bath of at least fifty tons of molten iron, in subjecting the molten iron to the action of suitable metallic oxids, in facilitating the reaction by means of one or more air-blasts, and then adding to the bath such substance or substances as will convert the molten iron into steel of the desired analysis.

6. The process of making steel, which consists in providing within a suitable receptacle a bath of at least fifty tons of molten iron, in subjecting the molten iron to the action of suitable metallic oxids and fluxes and one or more blasts of air, and then adding to the bath such substance or substances as will convert the molten iron into steel of the desired analysis.

7. The process of making steel, which consists in providing within a suitable receptacle a bath of at least fifty tons of molten iron, in subjecting the molten iron to the action of suitable purifying agents and one or more blasts of air so directed that an intense heat is generated and maintained in close proximity to the metal, and then adding to the bath such substance or substances as will convert the molten metal into steel of the desired analysis.

In testimony whereof I have hereunto subscribed my name this 10th day of November, 1904.

HERMAN A. BRASSERT.

Witnesses:
   JNO. S. GREEN,
   DAVID WILLIAMS.

---

Copies of this patent may be obtained for five cents each, by addressing the "Commissioner of Patents, Washington, D. C."